No. 658,834. Patented Oct. 2, 1900.
C. S. & H. F. DRAKE.
VEHICLE.
(Application filed Feb. 19, 1900.)
(No Model.)

Witnesses:
O. H. Keeney
Anna V. Faust

Inventors:
Clarke S. Drake
Harry F. Drake
By Benedict Morsell
Attorneys.

UNITED STATES PATENT OFFICE.

CLARKE S. DRAKE AND HARRY F. DRAKE, OF MILWAUKEE, WISCONSIN.

VEHICLE.

SPECIFICATION forming part of Letters Patent No. 658,834, dated October 2, 1900.

Application filed February 19, 1900. Serial No. 5,678. (No model.)

*To all whom it may concern:*

Be it known that we, CLARKE S. DRAKE and HARRY F. DRAKE, of Milwaukee, in the county of Milwaukee and State of Wisconsin, have invented a new and useful Improvement in Vehicles, of which the following is a description, reference being had to the accompanying drawings, which are a part of this specification.

Our invention relates to improvements in running-gear for vehicles with wheels, and is chiefly in means for guiding the vehicle, especially for changing the direction or course of its travel.

Our improved devices and apparatus are especially adapted for employment in a child's carriage, and we therefore herewith illustrate our improvements in connection with a child's carriage, but do not wish thereby to limit our invention to use in such a carriage, as with suitable changes, such as any mechanic could make, the improvements are adapted for use in any kind of a vehicle with wheels.

The invention consists of the devices and apparatus and their combinations as herein described and claimed or the equivalents thereof.

Figure 1:
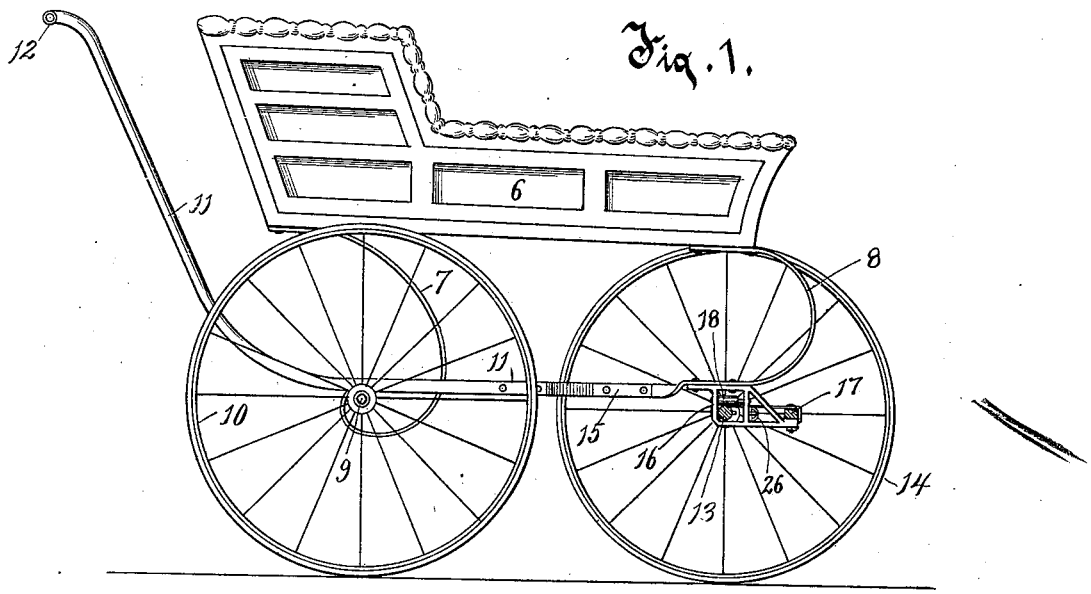
Figure 2:
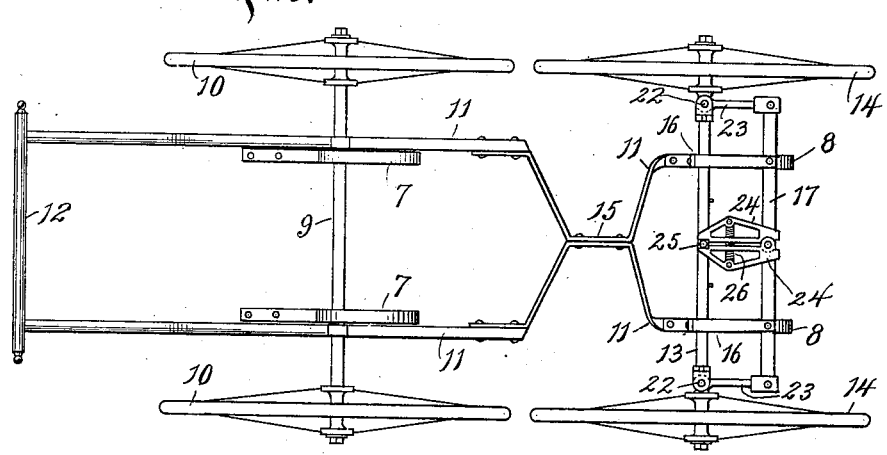
Figure 3:
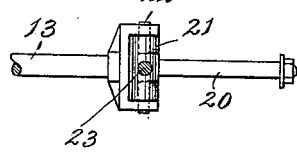
Figure 4:
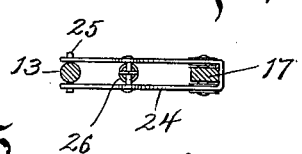
Figure 5:
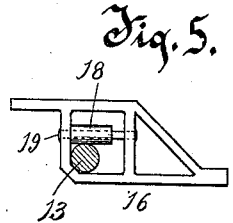

In the drawings, Figure 1 is a side elevation of a child's carriage embodying our improvements, the front axle being in section and the front wheel in the foreground being omitted. Fig. 2 is a view of the under side of the child's carriage of Fig. 1, showing our improvements therewith. Fig. 3 is a detail of one spindle of the front axle and of the joint by which it is hinged to the body of the axle, a fragment only of the axle-body being shown. Fig. 4 is a detail of a device for automatically holding the spindles of the front axle yieldingly in a right line with the axle, the axle and a transverse bar of the frame being shown in section. Fig. 5 is a detail of the construction for supporting the frame movably on the axle, the axle being in section.

In the drawings, 6 is the body of a child's carriage. This body is supported on rear springs 7 7 and on front springs 8 8. The rear springs 7 7 are secured to the rear axle 9, which axle is provided with wheels 10 10. The front springs 8 8 are secured to the side bars 11 11 of the frame. The side bars 11 11 are secured to the rear axle 9 and in this child's carriage are continued rearwardly and upwardly and at their extremities are provided with a cross-bar handle 12, by means of which an attendant can push or draw the carriage about. The side bars 11 11, a little at the rear of the front axle 13, are carried inwardly toward each other, providing a space in which the front wheels 14 14 may severally enter when the carriage is being turned or run in a circular direction or at an angle to a preceding direction. The front portions of these side bars 11 11 are conveniently made of light steel bars that are bent inwardly, forming the front-wheel spaces hereinbefore described, and these steel bars are advisably brought together at 15 and riveted to each other, thus strengthening the construction. The side bars 11 11 in the construction shown in the drawings are continued forwardly of the axle 13 in and by the curved springs 8, that are turned upwardly and support the front end of the carriage-body 6 thereon. At the points where these side bars come to and pass over the axle 13 they are each provided with a subframe 16, advisably constructed of light steel bars, which frame consists, preferably, of a substantially-parallelogram frame with its upper side extending rearwardly and riveted to the side bar 11 and its lower side extending forwardly of the front axle, the forward extensions of these two frames being connected rigidly by a transverse bar 17. The axle 13 extends transversely through the subframes 16, the axle spaces or apertures through which are of such dimensions as to provide a little play for the axle toward the front and rear. These subframes are provided with bearings that rest on the axle 13, which may be constructed conveniently of antifriction-rollers 18 18, mounted on pins 19 19, fixed in and extending forwardly and rearwardly of the subframe 16. The rollers 18 rest revolubly on the axle 13, and besides having rotation on the pins 19 also have play endwise on the pins 19. The rollers 18 are of such length as to permit of a limited movement of the axle 13 on the perimeters of the rollers endwise, thus providing for a play of the axle along on the rollers endwise and also of a play of the rollers endwise on the pins 19. The rear axle 9, with the side bars 11, the subframe 16, and the transverse bar 17 make up what may be properly termed the rigid frame of the vehicle.

The spindles 20 20, on which the front wheels 14 are mounted revolubly, are each hinged to the axle 13. For this purpose the spindles 20 are each provided with a head 21, that fits into a recess formed by the furcate extremities of the axle 13 and is pivoted therein by a pin 22. These spindles are so hinged to the axle 13 as to permit them to swing toward the front and rear in a horizontal plane. The spindle-heads 21 are each provided with a rigid forwardly-extending crank-arm 23, that at its front extremity is pivoted to the transverse bar 17. The spindle 20 and the crank-arm 23 form, essentially, a bell-crank in construction and movement pivoted on the extremity of the axle 13. The construction is such that by forcibly shifting the side bars 11, with the subframe 16 and transverse bar 17 rigid thereto, laterally either to the right or left the spindles 20 will be synchronously and equally swung one forwardly and the other rearwardly, thereby securing a change of direction of the travel of the vehicle, while at the same time the axle 13 will be correspondingly shifted laterally in the subframe 16, or transversely of the rigid frame of the vehicle.

For normally holding the spindles 20 in a right line with the axle 13 and for aiding to retrieve them to these positions when they have by force been shifted therefrom an automatic alining or retrieving device is provided, which consists of two levers 24 24, which are preferably in trussed form, are pivoted to the transverse bar 17, and extend rearwardly therefrom to the axle 13, on which they are adapted to act by means of contact severally with a pin 25, inserted in the axle, which pin serves as a catch against which the levers contact on the respective sides thereof. These levers 24 are preferably made in U form, the bend passing around the bar 17, the furcate legs of the lever straddling the bar 17 and the axle 13. The levers 24 are disposed near to and complementary to each other, so that each may swing away from the other when in the normal position shown in Fig. 2, but cannot swing toward the other away from such normal position, which is substantially at a right angle to the bar 17. These levers 24 24 are held yieldingly and actively to each other by a coiled-wire spring 26, secured at its extremities to the levers 24 24, medially at distant parts thereof. The construction is such that the axle 13 and bar 17 are held normally yieldingly in the positions with reference to each other shown in Fig. 2; but when by swinging the bar 17 forcibly laterally the axle 13 is shifted in the opposite direction laterally a lever 24, swinging with the shifting of the axle, will by the action of the spring 26 be automatically retrieved or aided to return to its normal position relative to the rigid frame, carrying the axle with it.

What we claim as our invention is—

1. In combination, a rigid vehicle-frame, a laterally-shiftable axle, wheel-spindles hinged to the axle, and crank-arms rigid on and radiating from the spindles and pivoted to the rigid frame.

2. In combination, a rigid vehicle-frame, an axle on which the frame rests shiftable laterally with reference to each other, wheel-spindles hinged to the extremities of the axle, crank-arms rigid on and radiating from the spindle-heads, and means rigid on the frame connecting the cranks of both spindles to the rigid frame.

3. In combination, a rigid vehicle-frame, an axle shiftable endwise with reference to the frame, bearing-rollers mounted in the frame transversely of and resting revolubly on the axle, wheel-spindles hinged to the axle, and crank-arms rigid to and radiating from the spindles and jointed to a frame member.

4. In combination, a rigid vehicle-frame, an axle shiftable endwise with reference to the frame, bearing-rollers mounted revolubly and movable endwise in the frame transversely of and resting on the axle, wheel-spindles hinged to the axle, and crank-arms rigid to and radiating from the spindle-heads and jointed to a frame member.

5. In combination, a rigid vehicle-frame, an axle shiftable endwise transversely of the frame, a subframe rigid to and forming a part of the vehicle-frame, a roller mounted in the subframe above and transversely of the axle the roller being revoluble and shiftable endwise on its axle-pin, and means for shifting the frame and axle laterally relative to each other.

6. In combination, a rigid frame member as 17, an adjacent axle shiftable relatively endwise, and a retrieving device comprising a pair of levers hinged to the frame member and extending to the axle and adapted severally to engage a catch on the axle and capable of swinging away from but not across the line between the levers, and a yielding spring drawing the levers actively toward each other.

7. In combination a rigid frame member as 17, an adjacent axle shiftable relatively endwise, and a retrieving device comprising a pair of U-shaped levers straddling and hinged to the frame member and extending to and straddling the axle, a pin in the axle adapted to be engaged at its respective ends and on its respective sides by the U-shaped levers, means permitting each lever to swing away from but not across the line between the levers, and a spring adapted to retrieve a lever when forcibly swung away from the line between the levers.

8. In a vehicle, a rear axle, side bars secured rigidly to said axle, a front axle with wheels capable of being swung into planes at oblique angles to the rear axle, and portions of the side bars bent toward and made to abut against each other and there bolted or riveted to each other forming spaces for wheels on the front axle when the wheels are shifted to oblique angles to the rear axle.

In testimony whereof we affix our signatures in presence of two witnesses.

CLARKE S. DRAKE.
HARRY F. DRAKE.

Witnesses:
C. T. BENEDICT,
ANNA V. FAUST.